United States Patent Office 3,170,947
Patented Feb. 23, 1965

3,170,947
PREPARATION OF CYANFORMAMIDE
Wilhelm Gruber, Darmstadt, and Werner Rank, Erlenbach, near Heilbronn (Neckar), Germany, assignors to Rohm & Haas G.m.b.H., Darmstadt, Germany
No Drawing. Filed Sept. 5, 1962, Ser. No. 221,426
Claims priority, application Germany, Sept. 16, 1961,
R 31,121
9 Claims. (Cl. 260—465.4)

This invention relates to a novel and expeditious method of preparing cyanformamide, a compound that is not only useful per se because of its insecticidal activity, but is also useful as an intermediate in the preparation of other valuable compounds.

It has now been found that cyanformamide can be prepared in a practically pure form and with high yields by reacting a cyanformimido ester of a monohydric alcohol with anhydrous hydrogen chloride or bromide to split the ester into the desired cyanformamide and a monohydric alcohol halide. This reaction takes place as indicated in the equation immediately below:

(A) 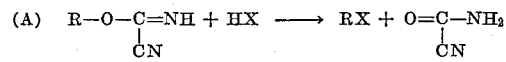

in which R can be alkyl, alkenyl or aralkyl, depending upon the particular alcohol used in preparing the cyanformimido ester.

The cyanformimido ester used as starting material in the method of this invention is readily obtainable, e.g., by reacting dicyan with a monohydric alcohol at a temperature between about 0 and 30° C., if desired in the presence of a suitable alkaline catalyst in a concentration of about 0.1 to 1 percent, as indicated in the equation:

(B) 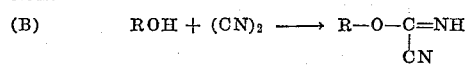

The alcohol may be any monohydric alcohol that is liquid under the reaction conditions. Lower alkyl, lower alkenyl and lower aralkyl alcohols are preferred. Allyl alcohol is particularly desirable because of the ease with which the halide thereof can be separated from cyanformamide and because said halide can readily be saponified by known means for recovering the allyl alcohol and recycling it for further use in Step A of the process. Methyl alcohol and benzyl alcohol are also preferred because of their ready accessability and low cost.

The method of the invention is preferably but not necessarily carried out in the presence of an inert liquid solvent. Aliphatic and cyclic ethers and halogenated hydrocarbons are particularly preferred, diethyl ether, tetrahydrofuran and carbon tetrachloride being most practical. The reaction is preferably carried out at a temperature between about 0° C. and the melting point (63° C.) of cyanformamide to obtain the latter in a readily separable form.

While satisfactory yields of cyanformamide are obtainable in Reaction A without the use of a catalyst, appreciably higher yields, i.e., over 90 percent and as high as 99 percent, are obtainable by carrying out the reaction in the presence of a suitable Lewis acid catalyst, e.g., aluminum chloride, aluminum bromide, stannic chloride, ferric chloride, zinc chloride and boron trifluoride.

Procedural details of the process will become further apparent from the following examples which are included to illustrate several of the best modes now contemplated for carrying out the process of this invention.

Example 1

30 grams of cyanformimido methyl ester, obtained by reacting dicyan with an equimolar amount of methanol in the presence of an alkaline catalyst while cooling to maintain the temperature at about 5° C., were added dropwise to a solution of 13.04 grams of hydrogen chloride in 50 ml. anhydrous diethyl ether at the boiling temperature of the ether. After stirring for one hour at 35° C., the ether was removed and the residue was recrystallized from benzene.

Cyanformamide was obtained as a pure product in a yield of 65 percent. It has a melting point of 62 to 63° C.

Example 2

0.2 gram (1 percent by weight) of each of the catalysts listed in the table below were dissolved in aliquot 50 ml. portions of diethyl ether containing 8.67 grams of anhydrous hydrogen chloride. To each of these solutions, 20 grams of cyanformimido methyl ester, obtained as described in Example 1, were added drop by drop at 35° C. After stirring for one hour, the following yields of cyanformamide were obtained:

| Catalyst: | Yield in percent |
|---|---|
| $AlCl_3$ | 89.2 |
| $SnCl_4$ | 92.6 |
| $FeCl_3$ | 94.4 |
| $ZnCl_2$ | 97.0 |
| $BF_3$ | 99.0 |

Example 3

20 grams of cyanoformimido allyl ester, obtained by reacting dicyan with an equimolar amount of allyl alcohol containing 0.5 percent by weight of potassium cyanide while cooling to maintain the temperature at about 5° C., were split in the manner described in Example 2 with the use of one percent of boron trifluoride as catalyst. Cyanformamide was obtained in a practically quantitative yield and had a melting point of 61 to 62° C. A similar result was obtained by conducting the splitting reaction in carbon tetrachloride as the inert solvent in place of diethyl ether.

Example 4

95 grams of anhydrous hydrogen bromide were added to 200 grams of cyanformimido benzyl ester dissolved in 1000 grams of tetrahydrofuran containing 2 grams of aluminum bromide while maintaining the temperature at approximately 60° C.

Cyanformamide was obtained in a yield of 89 percent. After a single recrystallization, it had a melting point of 63° C.

It is to be understood that various modifications will readily become apparent to those skilled in the art upon reading this description. All such modifications are intended to be included within the scope of the intended claims.

We claim:

1. A process for preparing cyanformamide which comprises reacting a cyanformimido alcohol ester of the formula

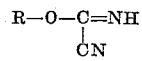

wherein R is a member of the group consisting of lower alkyl, lower alkenyl and lower aralkyl, with an anhydrous hydrogen halide selected from the group consisting of hydrogen chloride and hydrogen bromide at a temperature between about 0 and 63° C.

2. Process as defined in claim 1 wherein R is allyl.
3. Process as defined in claim 1 wherein R is methyl.
4. Process as defined in claim 1 wherein R is benzyl.
5. Process as defined in claim 1 wherein the reaction is carried out in the presence of an inert solvent.
6. Process as defined in claim 1 wherein the reaction is carried out in the presence of an inert solvent selected from the group consisting of aliphatic ethers, cyclic ethers and halogenated hydrocarbons.
7. Process as defined in claim 1 wherein the reaction is carried out in the presence of a Lewis acid catalyst.
8. Process as defined in claim 1 wherein the reaction is carried out in the presence of a Lewis acid catalyst selected from the group consisting of boron trifluoride, aluminum chloride, aluminum bromide, stannic chloride, ferric chloride and zinc chloride.
9. A process for preparing cyanformamide which comprises reacting, at a temperature between about 0 and 63° C., cyanformimido allyl ester with anhydrous hydrogen chloride in an inert solvent to split said ester into cyanformamide and allyl chloride, and separating said reaction products.

References Cited in the file of this patent
UNITED STATES PATENTS

| | | |
|---|---|---|
| 2,804,470 | Welcher | Aug. 27, 1957 |
| 2,804,471 | Welcher | Aug. 27, 1957 |

OTHER REFERENCES

Welcher et al.: J.A.C.S., 81 (1959), pages 2541–2547.